No. 824,886. PATENTED JULY 3, 1906.
W. H. SANDERSON.
SCALE.
APPLICATION FILED SEPT. 17, 1903. RENEWED JAN. 22, 1906.
2 SHEETS—SHEET 1.
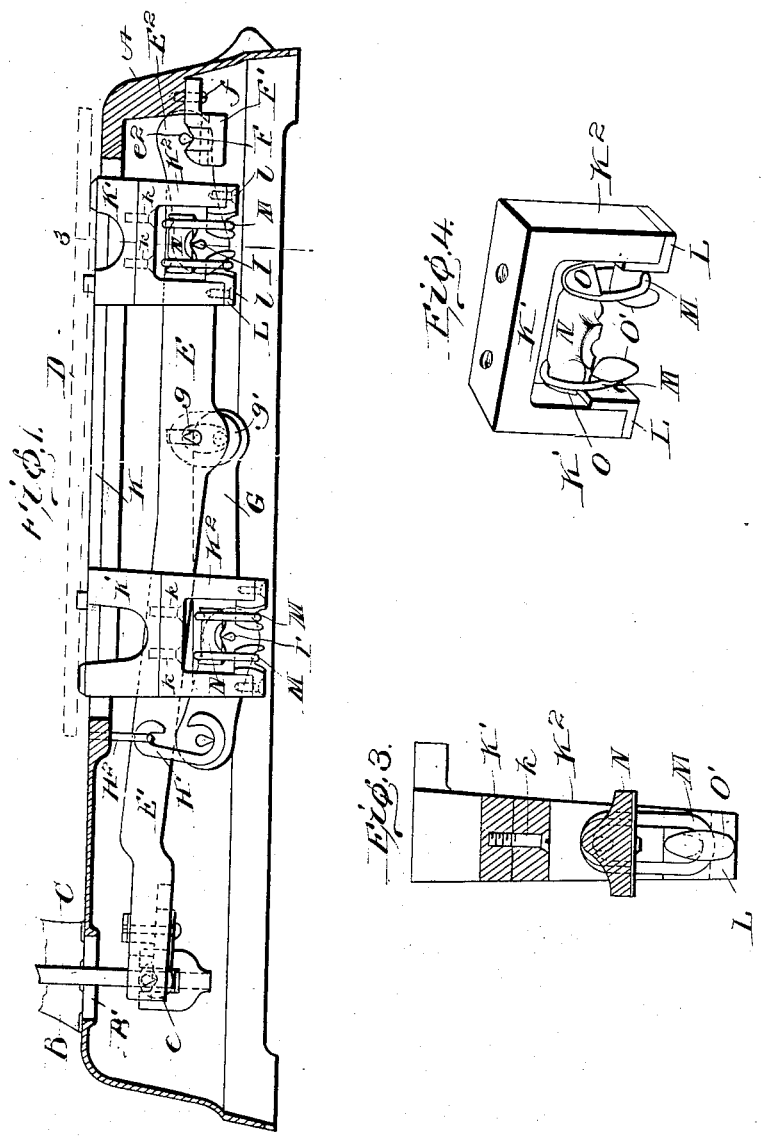
Witnesses
J. M. Fowler Jr
Thomas Durant
Inventor
William H. Sanderson
By Church & Church
his Attorneys

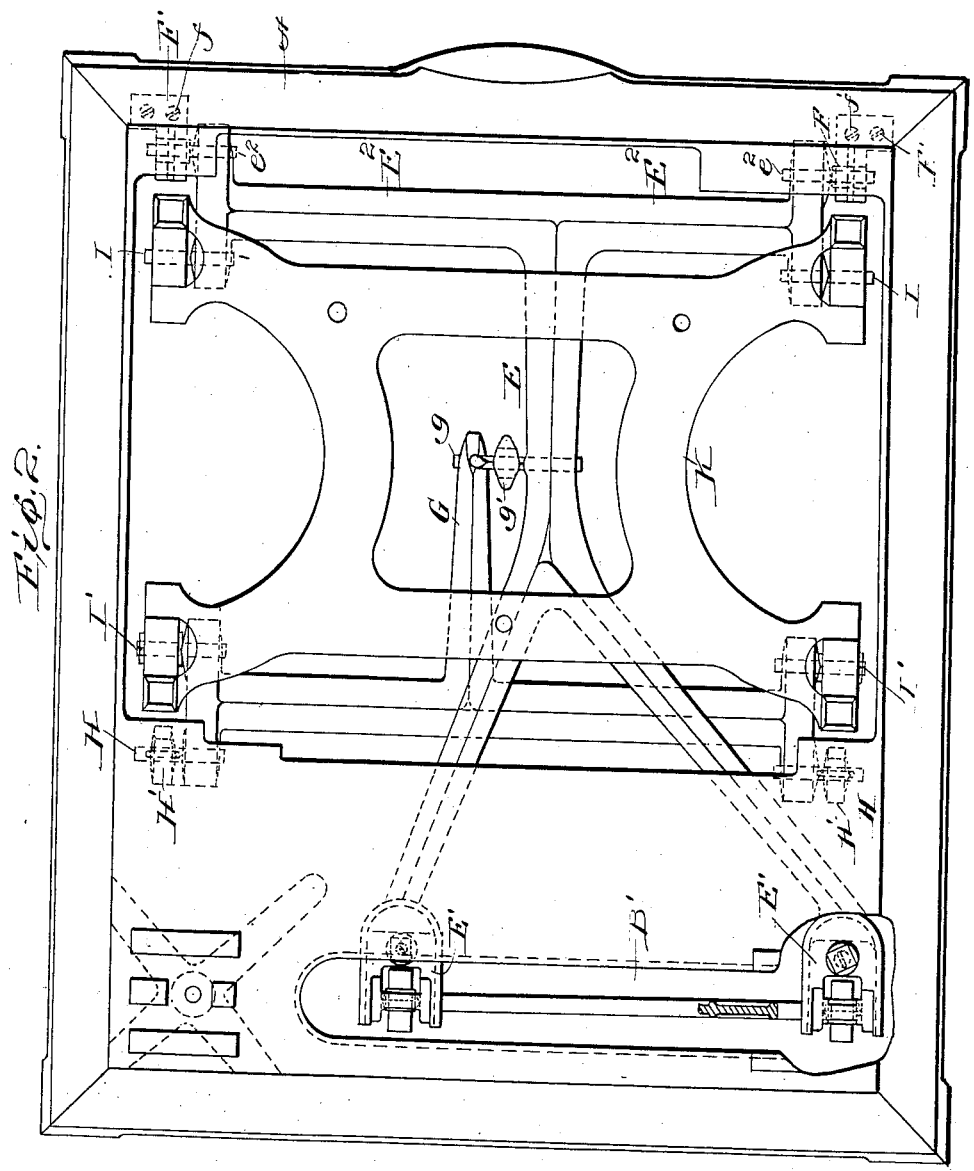

UNITED STATES PATENT OFFICE.

WILLIAM H. SANDERSON, OF DAYTON, OHIO, ASSIGNOR TO THE COMPUTING SCALE COMPANY, OF DAYTON, OHIO, A CORPORATION OF OHIO.

SCALE.

No. 824,886.  Specification of Letters Patent.  Patented July 3, 1906.

Application filed September 17, 1903. Renewed January 22, 1906. Serial No. 297,221.

*To all whom it may concern:*

Be it known that I, WILLIAM H. SANDERSON, of Dayton, in the county of Montgomery, State of Ohio, have invented certain new and useful Improvements in Scales; and I do hereby declare the following to be a full, clear, and exact description of the same, reference being had to the accompanying drawings, forming a part of this specification, and to the letters of reference marked thereon.

This invention relates to improvements in weighing-scales of the platform type—that is to say, scales wherein a base-housing is employed for the reception of the platform-levers and supports with a connection extending into said base and thence up to a suitable beam or counterbalancing mechanism located above the level of the base and usually supported by standards attached to the base. To attain the highest degree of accuracy in scales of this character, particularly where the connection of the levers with the beam or counterbalancing mechanism is short or the levers themselves are short, the beams and levers should be as rigidly held in position as possible contingent upon the necessary freedom of action, for it should be understood that all the connections must be perfectly free and flexible, inasmuch as binding or friction due to transverse strains will immediately affect the accuracy of the scale.

The present invention has for its object to provide a construction wherein the platform-levers will be so supported that the connection with the beam or counterbalancing mechanism shall travel in a fixed definite path and at the same time the platform itself be so supported that the connections with the levers and between the levers themselves will permit of a perfect flexibility and freedom of movement under all conditions or stresses set up by the load placed on the platform, and that without the employment of the usual check hooks or wires, which as heretofore employed introduced an element of uncertainty or liability of inaccuracy due to their restraining action upon the movements of the platform or its supports.

The invention further consists in certain novel details of construction and combinations and arrangements of parts, all as will be now described, and pointed out particularly in the appended claims.

Referring to the accompanying drawings, Figure 1 is a transverse section through the base or housing of a platform-scale, showing the levers, platform-supporting mechanism, and connection with the beam or counterbalancing mechanism in elevation. Fig. 2 is a top plan view of the same with the platform removed. Fig. 3 is a detail sectional elevation through one of the platform-supports, the section being taken on the line 3 3 of Fig. 1, but with the platform-lever and knife-edge bearing omitted. Fig. 4 is a detail perspective view of the lower portion of one of the platform-supports shown in section in Fig. 3.

Like letters of reference in the several figures indicate the same parts.

The base or housing (indicated by the letter A in the accompanying drawings) is shown of conventional rectangular form, and it will be understood that it may be of any of the usual or preferred types now in common use for platform counter-scales, the said housing being provided at one end with the usual means whereby standards B (the bases only of which are shown) may be attached and with an opening B' for the passage of the draft connections or connections C extending up to the beam or counterbalancing mechanism, which may be of any preferred type, but is preferably of that type wherein there is a shifting connection between the draft connections and the beam in order that the leverage of the beam may be varied for indicating prices and values of articles, in addition to their weight, as is now well understood in this art. The base or housing A is further provided with a relatively large opening beneath the platform D, Fig. 1, for the passage of the platform-supporting mechanism, as will be presently described.

In the type of scale illustrated the main platform-lever E is bifurcated at its power end, and its two arms E' are provided with knife-edges or bearings $e$, with which the lower portion of a vertically-extending frame C engages, the said frame C being thus free to swing on said bearings $e$ in one plane only. At the opposite end the said lever E' is widened or extended transversely to form arms $E^2$, the latter being provided with knife-edges $e^2$, which rest in alined fixed bearings F. The bearings F, before referred to, are rigidly supported by brackets F', secured in place on the base or housing A by screws $f$, although it will be understood that any other well-known or preferred means for supporting these bearings may be employed, provided that they are supported rigidly, so as to prevent transverse movement of the lever in any direction and so as to confine the draft connection to a fixed definite path.

The knife-edges $e^2$ and $e$ on the lever E should be in a substantially horizontal plane in order that the path traversed by the bearings $e$ in the operation of the scale shall be curved to the slightest possible extent, or, in other words, that the draft connection C should be caused to travel as nearly as possible in a true vertical plane. In practice the lever E is a long lever moving through a very limited arc, and as a consequence the draft connection is for practical purposes given a movement in a vertical plane, although theoretically it does travel in a very slight arc, which arc, however, is so slight as to be negligible in its effect upon the operation of the scale.

The other one of the two platform-levers employed is lettered G, and at one end it is connected centrally with the platform-lever E by knife-edges $g$ and a link $g'$, as is usual in this class of scales. At its opposite end this platform-lever G is pivotally supported in swinging or flexible bearings formed by knife-edges H and links H' suspended from loops $H^2$ on the base or housing A. Thus it will be noted that the platform-levers are supported at four points widely separated, and the necessary freedom of movement or looseness to permit of the platform-levers swinging in opposite arcs is permitted by the swinging pivotal bearings of one of the levers— i. e., that one of the levers which is not directly connected with the draft connection C.

The platform-levers E and G are provided with knife-edges I I', respectively, located in proper proximity to their pivotal supports, and the platform is mounted on these knife-edge bearings, the connections with the platform being such that the platform and its attached parts may be readily lifted off of the knife-edges and when assembled will gravitate to their proper positions and will always tend to return to such position when moved transversely by the application of the load or otherwise, thus obviating the necessity of employing check wires or hooks, as heretofore.

The platform D, before referred to, is directly supported on a spider or skeleton frame K having depending supports or legs K', the lower portions of which are bifurcated, forming branches $K^2$, the bifurcated portions being preferably detachable from the legs K' and secured in place by screws $k$. Thus the legs K' may be made of a proper length and the bifurcated portions, with their attachments, to be hereinafter described, made uniform and assembled separately therefrom and subsequently attached to the legs K' in assembling the scale. The branches $K^2$ of the legs are each provided at the bottom with detachable hook-shaped brackets L, secured in place by screws $l$, the brackets on each pair of branches extending toward each other, but leaving a sufficient space between their proximate ends for the passage of the knife-edges I I'. Embracing each of the hook-shaped brackets L is a link M, and between the upper ends of the links M of each pair of branches there is mounted a saddle-bearing N, which rests on the knife-edge bearings I I' and supports the skeleton and platform proper. The saddle-bearings N and hook-brackets L are provided with rounded bearing-surfaces with which the links engage, and the extremities of these parts are so formed with heads O and projections O' that when assembled their complete disengagement is prevented, and consequently the skeleton frame, together with the links, saddle-bearings, &c., may be lifted up off of the platform-levers, giving access to all of the parts within the base, and when the parts are to be again assembled it may be done by simply returning the skeleton to its place, when the bearings will find their proper seats without further attention on the part of the assembler.

In the preferred construction the saddle-bearings N are elongated lengthwise of the knife-edges, as shown in Fig. 3, and because of the construction before described there will be a uniform bearing throughout the length of the knife-edge at all times, and, furthermore, by so forming the saddle-bearings N they will prevent displacement longitudinally of the knife-edges by contacting with the platform-levers.

It will be noted that the platform and its supports are rigid to a point below the knife-edges on the levers. In effect, it is swung below said knife-edges and will always gravitate to its proper and normal position with respect to the lever and base A, and as a consequence no check wires or hooks need be employed. All variations in the distance between the knife-edges are compensated for by the swinging and loose connections, and at the same time the main platform-lever to which the draft connection is jointed is mounted in fixed bearings and said draft connection is caused to travel in a fixed and definite path regardless of the lateral vibrations or swinging movements of the platform or parts of the lever system with which the platform is connected.

Having thus described my invention, what I claim as new, and desire to secure by Letters Patent, is—

1. In a platform-scale, the combination with the base-housing and platform, of a platform-lever pivotally mounted at one end in fixed bearings in alinement in the base-housing, a draft connection for the counterbalancing mechanism pivotally connected with the opposite end of the lever at two points, a second platform-lever pivotally mounted in swinging bearings in the base-housing and loosely connected with the first-mentioned platform-lever intermediate the supporting-bearings for the levers, outwardly-projecting parallel knife-edge bearings on both levers also intermediate the lever-supporting bearings, a rigid platform-support located above the levers and having bifurcated portions one at each corner extending below the knife-edge bearings, saddle-bearings resting on the knife-edges and links connecting the saddle-bearings and portions of the bifurcated platform-supports below the knife-edge bearings; substantially as described.

2. In a platform-scale, the combination with the platform-levers having knife-edge bearings for the platform, of the platform-supports having detachable bifurcated ends extending down beside the knife-edge bearings, detachable brackets on said bifurcated portions projecting toward each other, saddle-bearings resting on the knife-edges and links connecting the ends of the saddle-bearings and brackets, said links resting in rounded bearings and the parts being so proportioned that the saddle-bearings, links and supports will remain connected when removed from the scale; substantially as described.

WILLIAM H. SANDERSON.

Witnesses:
GEO. W. KEPLER,
E. A. SMITH.